United States Patent

Comstock

(10) Patent No.: US 9,811,213 B2
(45) Date of Patent: Nov. 7, 2017

(54) SYSTEMS AND METHODS FOR INPUT DEVICE NOISE MITIGATION VIA A TOUCH BUFFER

(71) Applicant: Synaptics Incorporated, Santa Clara, CA (US)

(72) Inventor: Michael Joseph Comstock, Sunnyvale, CA (US)

(73) Assignee: Synaptics Incorporated, San Jose, CA (US)

( * ) Notice: Subject to any disclaimer, the term of this patent is extended or adjusted under 35 U.S.C. 154(b) by 676 days.

(21) Appl. No.: 13/901,933

(22) Filed: May 24, 2013

(65) Prior Publication Data

US 2014/0267093 A1 Sep. 18, 2014

Related U.S. Application Data

(60) Provisional application No. 61/787,504, filed on Mar. 15, 2013.

(51) Int. Cl.
*G06F 3/041* (2006.01)
*G06F 3/044* (2006.01)

(52) U.S. Cl.
CPC .......... *G06F 3/044* (2013.01); *G06F 3/0418* (2013.01)

(58) Field of Classification Search
CPC ... G06F 3/044; G06F 3/041; G09G 2320/066; G09G 2330/021; G09G 2360/144; G09G 3/2007; G09G 3/3406
See application file for complete search history.

(56) References Cited

U.S. PATENT DOCUMENTS

| | | | |
|---|---|---|---|
| 5,053,757 A | 10/1991 | Meadows | |
| 7,643,011 B2 | 1/2010 | O'Connor et al. | |
| 8,040,142 B1 | 10/2011 | Bokma et al. | |
| 8,054,090 B2 | 11/2011 | Philipp et al. | |
| 8,169,421 B2 | 5/2012 | Wright et al. | |

(Continued)

FOREIGN PATENT DOCUMENTS

WO 2005081631 A2 9/2005

OTHER PUBLICATIONS

Korean Intellectual Property Office International Searching Authority, International Search Report and Written Opinion for International Application No. PCT/US2014/025972, mailed Aug. 25, 2014.

*Primary Examiner* — Insa Saido
(74) *Attorney, Agent, or Firm* — Osha Liang LLP

(57) ABSTRACT

A processing system for an input device includes a sensor module and a noise mitigation module. The sensor module includes sensor circuitry and is configured to drive a plurality of transmitter electrodes with transmitter signals, and receive, with a plurality of receiver electrodes, resulting signals comprising effects corresponding to the transmitter signals. The noise mitigation module is configured to determine positional information for a first input object in a sensing region of the input device based on the resulting signals and to report the positional information. The noise mitigation module includes a touch buffer configured to store a plurality of input object states corresponding to the first input object and is configured to limit, when in a high-noise mode, the reporting of positional information based on the plurality of input object states stored in the touch buffer.

17 Claims, 3 Drawing Sheets

(56) References Cited

U.S. PATENT DOCUMENTS

| | | |
|---|---|---|
| 8,174,273 B2 | 5/2012 | Geaghan |
| 2004/0004488 A1 | 1/2004 | Baxter |
| 2006/0221061 A1 | 10/2006 | Fry |
| 2006/0227115 A1 | 10/2006 | Fry |
| 2007/0262969 A1 | 11/2007 | Pak |
| 2008/0040079 A1 | 2/2008 | Hargreaves |
| 2008/0157893 A1 | 7/2008 | Krah |
| 2008/0158169 A1 | 7/2008 | O'Connor et al. |
| 2008/0158182 A1 | 7/2008 | Westerman |
| 2008/0180405 A1* | 7/2008 | Han .................... G06F 3/04883 345/173 |
| 2008/0309625 A1 | 12/2008 | Krah et al. |
| 2008/0309628 A1 | 12/2008 | Krah et al. |
| 2010/0139991 A1 | 6/2010 | Philipp et al. |
| 2010/0146389 A1* | 6/2010 | Yoo .................... G06F 3/04815 715/702 |
| 2011/0096011 A1 | 4/2011 | Suzuki |
| 2011/0157077 A1 | 6/2011 | Martin et al. |
| 2011/0175827 A1* | 7/2011 | Bogue ........................... 345/173 |
| 2011/0254802 A1 | 10/2011 | Philipp |
| 2011/0285654 A1* | 11/2011 | Park et al. .................... 345/173 |
| 2012/0056822 A1 | 3/2012 | Wilson et al. |
| 2012/0139846 A1 | 6/2012 | Krah et al. |
| 2012/0182229 A1 | 7/2012 | Shepelev et al. |
| 2012/0260220 A1* | 10/2012 | Griffin .................... G06F 3/017 715/863 |
| 2013/0057514 A1 | 3/2013 | Murphy et al. |
| 2014/0176448 A1* | 6/2014 | Huie ............................. 345/173 |

\* cited by examiner

SYSTEMS AND METHODS FOR INPUT DEVICE NOISE MITIGATION VIA A TOUCH BUFFER

CROSS-REFERENCE TO RELATED APPLICATIONS

This application claims priority to U.S. Provisional Pat. App. No. 61/787,504, filed Mar. 15, 2013, the entire contents of which are hereby incorporated by reference.

FIELD OF THE INVENTION

This invention generally relates to electronic devices, and more specifically relates to sensor devices.

BACKGROUND OF THE INVENTION

Input devices including proximity sensor devices (also commonly called touchpads, position sensing devices, or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

It is desirable for input devices to operate correctly under noisy conditions. In order to do so, noise mitigation methods are often employed. However, currently known noise mitigation techniques are undesirable in a number of respects. Consequently, there continues to be a need for systems and methods that improve noise mitigation in input devices.

BRIEF SUMMARY OF THE INVENTION

A processing system for an input device in accordance with one embodiment includes a sensor module and a noise mitigation module. The sensor module comprises sensor circuitry configured to drive a plurality of transmitter electrodes with transmitter signals and to receive, with a plurality of receiver electrodes, resulting signals comprising effects corresponding to the transmitter signals. The noise mitigation module is configured to determine positional information for an input object in a sensing region of the input device based on the resulting signals and to report the positional information, wherein the noise mitigation module comprises a touch buffer configured to store a plurality of input object states corresponding to the input object, and wherein the noise mitigation module is configured to limit, when in a high-noise mode, the reporting of positional information based on the plurality of input object states stored in the touch buffer.

A method for an input device in accordance with one embodiment comprises transmitting a plurality of transmitter signals using a plurality of transmitter electrodes; receiving, with a plurality of receiver electrodes, resulting signals comprising effects corresponding to the transmitter signals; determining positional information for an input object in a sensing region of the input device based on the resulting signals; reporting the positional information; and limiting, when in a high-noise mode, the reporting of positional information of the input object based on a touch buffer, wherein the touch buffer is configured to store a plurality of input object states corresponding to the input object.

A sensor device in accordance with one embodiment comprises a plurality of transmitter electrodes; a plurality of receiver electrodes, and a processing system communicatively coupled to the plurality of transmitter electrodes and the plurality of receiver electrodes. The processing system is configured to transmit a plurality of transmitter signals using the plurality of transmitter electrodes; receive, with the plurality of receiver electrodes, resulting signals comprising effects corresponding to the transmitter signals; determine positional information for an input object based on the resulting signals; report the positional information; and limit, when in a high-noise mode, the reporting of positional information of the input object based on a touch buffer, wherein the touch buffer is configured to store a plurality of input object states corresponding to the input object.

BRIEF DESCRIPTION OF DRAWINGS

The present invention will hereinafter be described in conjunction with the appended drawings, where like designations denote like elements, and.

DETAILED DESCRIPTION OF THE INVENTION

The following detailed description presents a number of example embodiments and is not intended to limit the invention or the application and uses of the invention. Furthermore, there is no intention to be bound by any expressed or implied theory presented in the preceding technical field, background, brief summary, or the following detailed description.

Figure 1:
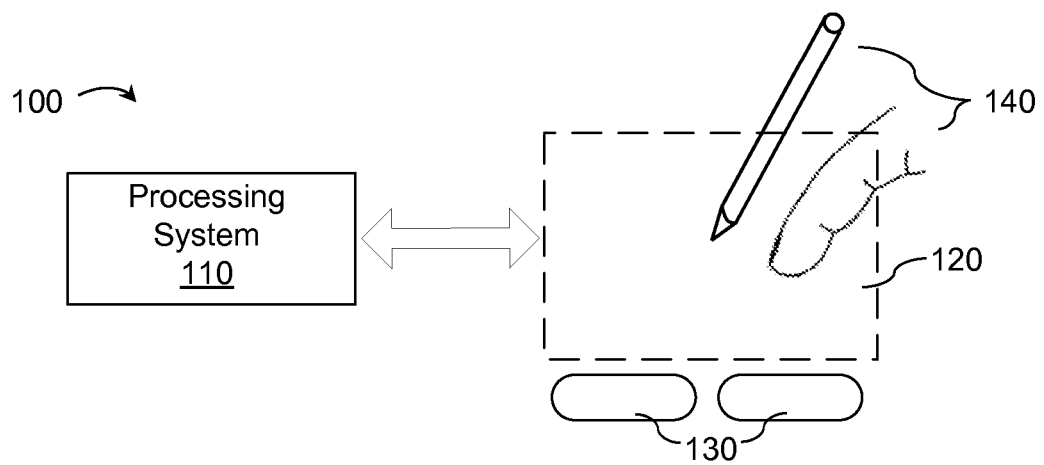
FIG. 1 is a block diagram of an example system that includes an input device in accordance with an embodiment of the invention.

Various embodiments of the present invention provide input devices and methods that facilitate improved usability. FIG. 1 is a block diagram of an example input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be substantially uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Figure 2:
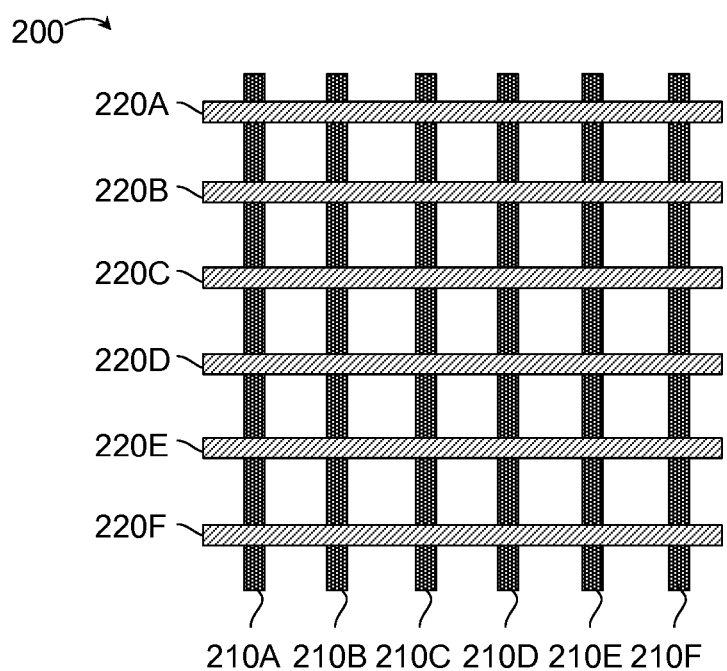
FIG. 2 is a conceptual block diagram depicting an example electrode pattern.

FIG. 2 illustrates, conceptually, an example set of capacitive sensor electrode pattern 200 configured to sense in a sensing region. For clarity of illustration and description, FIG. 2 shows a first set of elongated, rectangular sensor electrodes 210 (210A-F) arranged in a first direction, and a second set of elongated, rectangular sensor electrodes 220 (220A-F) arranged in a second direction substantially perpendicular to the first direction. It will be appreciated, however, that FIG. 2 shows a non-limiting example, and a variety of sensor electrode pattern—including ones that vary in sensor electrode layout, size, shape, number, material, and the like—may be suitable in various embodiments.

In sensor electrode pattern 220, sensor electrode 220A is adjacent to sensor electrode 220B, sensor electrode 220B is adjacent to both sensor electrode 220A and sensor electrode 220C. A group of adjacent sensor electrodes can bet termed a contiguous set of sensor electrodes. Thus, sensor electrodes 220A-D is a contiguous set of sensor electrodes, as are sensor electrodes 210B-C or 210B-E.

In sensor electrode pattern 200, sensor electrodes 210 and 220 of FIG. 2 are ohmically isolated from each other. In some embodiments, sensor electrodes 210, 220 are disposed as a single layer of conductive material on a substrate that are connected by electrical jumpers as appropriate; the sensor electrodes 210, 220 are separated from each other by local dispositions of insulative material disposed between the regions where a sensor electrode 210 overlaps with a sensor electrode 220. The insulative material may comprise one or more patches of insulative material that are printed, sputtered, or otherwise patterned. In some embodiments, sensor electrodes 210, 220 are separated by one or more substrates. For example, sensor electrodes 210 may be disposed on a first surface of a substrate, and sensor electrode 220 may be disposed on a second, opposite surface of the same substrate. As another example, sensor electrodes 210, 220 may be disposed on different substrates that are laminated together.

In one embodiment, sensor electrodes 210 and 220 are constructed from opaque or substantially opaque conductive materials. In other embodiments, sensor electrodes 210 and 220 are constructed in whole or in part from substantially transparent conductive material, such as patterned ITO, ATO, carbon nanotubes, or other substantially transparent materials.

In a transcapacitive embodiment of the sensor electrode pattern 220, sensor electrodes 220A-F are configured as receiver electrodes, and sensor electrodes 210A-F are configured as transmitter electrodes. That is, sensor electrodes 220, 210 are communicatively coupled with a processing system that operates them to receive or transmit as appropriate. In some embodiments, sensor electrodes 220, 210 are also shaped for better performance as receiver or transmitter electrodes. The capacitive coupling between the transmitter electrodes and receiver electrodes change with input near sensor electrode pattern 220, in the sensing region associated with sensor electrode pattern 220. In or more embodiments, the changes capacitive coupling between the transmitter and receiver electrode may be represented as a one-dimensional or two-dimensional image, or a "capacitive image" (also "capacitive frame"), the change in capacitive coupling between each transmitter electrode and each receiver electrode may be measured by processing system 110 and used to form the capacitive pixels of the capacitive image.

In one embodiment, multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" (also "baseline frames) when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In various embodiments, processing system 110 may apply baseline relaxation techniques to the baseline image. In one or more embodiments, baseline relaxation refers to the transitioning from a baseline to another baseline. Baseline relaxation is typically performed to adjust the baseline to account for the changes to the background capacitance based on environmental or operating condition changes. A baseline relaxation technique may refer to the speed at which the baseline is updated to account for the change in accordance with some embodiments. Baseline relaxation technique may additionally or alternatively refer to any equations used to adjust the baseline.

Referring again to FIG. 1, a processing system 110 is shown as part of the input device 100. The processing system 110 is configured to operate the hardware of the input device 100 (including, for example, the various sensor electrodes 200 of FIG. 2) to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes.

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes determination circuitry configured to determine positional information for an input device based on the measurement.

"Positional information" as used herein broadly encompasses absolute position, relative position, velocity, acceleration, and other types of spatial information. Example "zero-dimensional" positional information includes near/far or contact/no contact information. Example "one-dimensional" positional information includes positions along an axis. Example "two-dimensional" positional information includes motions in a plane. Example "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 3:
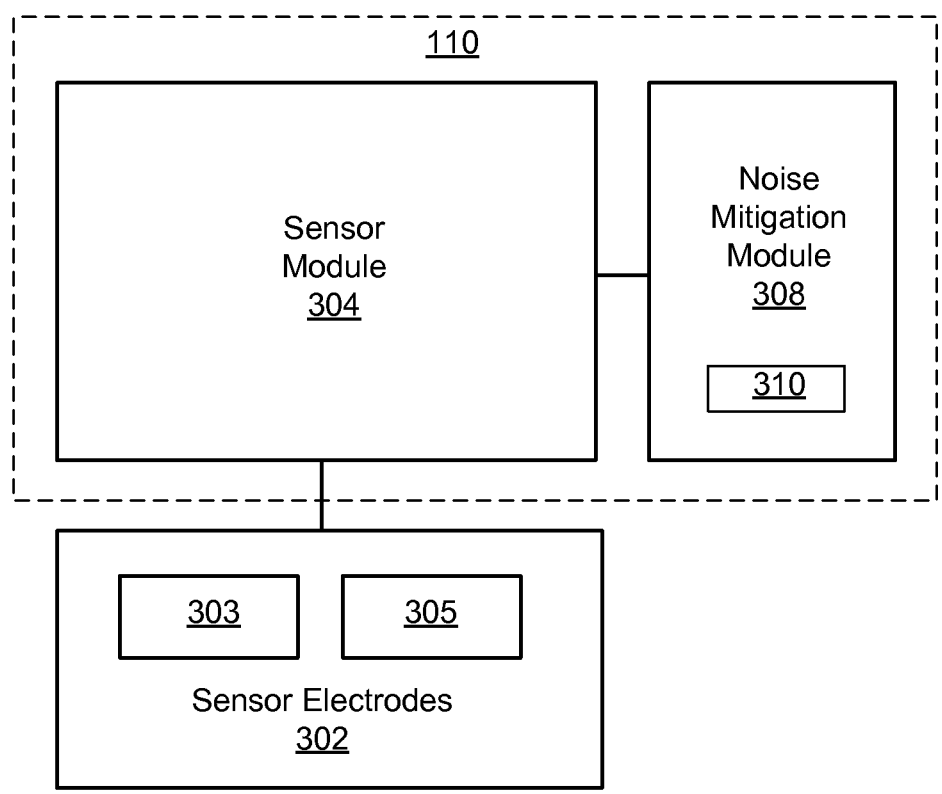
FIG. 3 is a conceptual block diagram depicting an example processing system in accordance with one embodiment.

Referring now to the conceptual block diagram depicted in FIG. 3, an example processing system 110 in accordance with one embodiment generally includes a sensor module 304 and a noise mitigation module 308 having a touch buffer (or simply "buffer") 310. Sensor module 304 is communicatively coupled to a set of sensor electrodes 302, which may include one or more transmitter electrodes 303 and one or more receiver electrodes 305. In some embodiments, sensor electrodes 302 are configured as described above in conjunction with FIG. 2. In other embodiments, a variety of sensor electrode configurations may be employed.

In general, sensor module 304 includes any combination of software and/or hardware (e.g., transmitter circuitry or receiver circuitry) configured to drive transmitter electrodes 303 with transmitter signals, and receive, with receiver electrodes 305, resulting signals comprising effects corresponding to the transmitter signals.

Noise mitigation module 308 includes any combination of hardware and/or software configured to determine positional information for an input object in a sensing region of the input device based on the resulting signals received with receiver electrodes 305. In some respects, noise mitigation module 308 assists in noise mitigation. In one embodiment, noise mitigation module 308 is further configured to limit, when in a high-noise mode, the reporting of position information of an input object based on touch buffer 310, wherein touch buffer 310 is configured to store a plurality of input object states corresponding to an input object. In one embodiment, each input object state corresponds to positional information of the input object (i.e., a state of the input object). In one embodiment, the touch buffer may be configured to store a plurality of input object states corresponding to the positional information of more than one input object.

Figure 4:
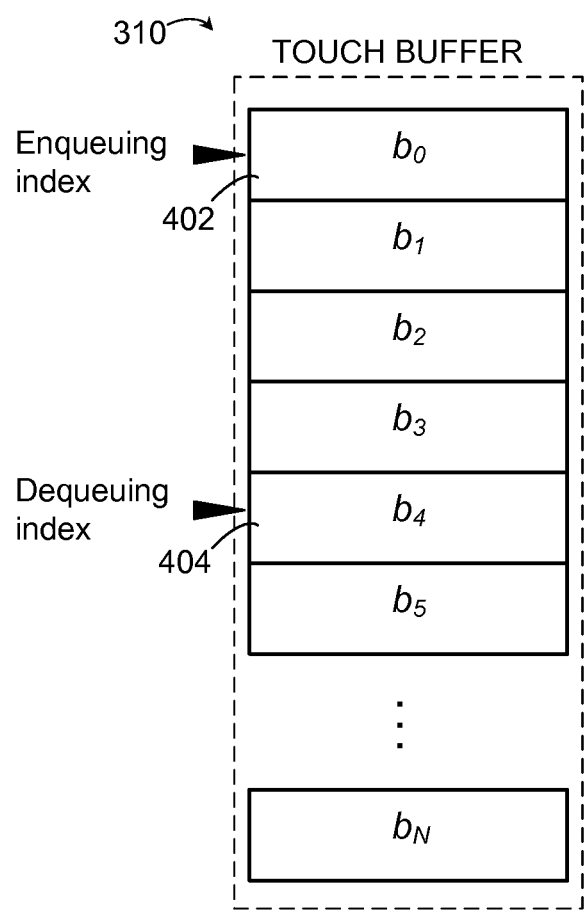
FIG. 4 is a conceptual diagram of a touch buffer in accordance with one embodiment.

More particularly, referring now to FIG. 4, touch buffer 310 (which may be implemented using any combination of hardware and software) is a buffer or queue data structure that includes N input object states, $b_0, b_1, \ldots b_N$, as illustrated, where the values $0, 1 \ldots N$ refer to the "index" of touch buffer 310. In the interest of brevity, input object states might also be referred to herein as a "states," "input object data," or simply "data."

In the illustrated embodiment, input object data enters touch buffer 310 at an enqueuing index 402, and exits touch buffer 310 at the Nth index. Thus, touch buffer 310 implements a first-in/first-out (FIFO) buffer, where input object data having higher indices are generally subsequent in time to those having lower indices. Input object data is read from touch buffer 310 at a dequeuing index 404 (in the example, at $b_4$). Stated another way, the data at dequeuing index 404 will typically relate to the "current" touch event being read (i.e., after a delay corresponding to a "distance" between enqueuing index 402 and dequeuing index 404). In various embodiments, a touch event may correspond to detection of an input object in the sensing region of the input device 100.

In some embodiments, as illustrated in FIG. 4, dequeuing index 404 may not correspond to index N. Indeed, as will be described in further detail below, it is advantageous in some embodiments for dequeuing index 404 to be located at approximately the middle of touch buffer 310 (i.e., at approximately N/2). This allows smoothing, averaging, interpolating, or other functions to take into account input object data that both precedes and is subsequent to dequeuing index 404. In various other embodiment, the dequeuing index 404 may be located at any position within touch buffer 310 and various processing techniques, including smoothing, averaging, interpolating, or the like may be applied to any portion of the input object data stored within touch buffer 310. The size N of buffer 310 may vary depending upon a variety of factors, including frame acquisition rate and other design factors. In one embodiment, for example, N is between approximately 7 and 11, inclusive. The invention is not so limited, however.

As used herein, the term "input object state" refers to information that characterizes the state (e.g., positional information) of an input object with respect to the sensing region. Touch buffer 310 may comprise data relating to the state or states of one, two, or even more input objects.

In one or more embodiments, noise mitigation module 408 is configured to limit the reporting of the positional information of input object 140 based on a comparison of a plurality of input object states stored within touch buffer 310 to an input object state threshold. If the number of the plurality of input object states satisfies the threshold number, the positional information may be reported.

As noted above, in various embodiments, noise mitigation module 308 is configured to limit the reporting of positional information of an input object (i.e., the positional information at the dequeuing index 404 is "filtered") when in a high-noise mode. The phrase "high-noise mode" as used herein refers to some threshold level of noise (which may be constant, dynamic, configurable, or otherwise set) above the level of noise considered a normal level for particular hardware in a particular context. In many embodiments, a normal level of noise may be determined based on measurements taken under known circumstances (during production or runtime), modeling techniques, statistical analysis, or any combination thereof. The measurement and characterization of noise levels for input devices is known in the art, and any known method may be applied to embodiments described.

In one embodiment, noise mitigation module 308 is configured to report positional information of a first input object when touch buffer 310 includes a threshold number of input object states corresponding to the first input object. Stated another way, noise mitigation module 308 reports only those events where the input object is present in the touch buffer for a certain number of sensing frames. This threshold may be dynamically determined (e.g., based on the determined level of noise, and/or other factors), configurable, or constant for particular hardware/software. In one embodiment, for example, noise mitigation module 308 examines about half of the input object states within touch buffer 310 to determine whether positional information should be reported. Referring to the example depicted in FIG. 4, such an embodiment would correspond to $b_4$-$b_N$. In one embodiment, as the measured noise increases the number of input object states that are used to determine whether to report positional information also increases. In one embodiment, once the level of noise satisfies a "high noise" threshold, the number of input object states that are used to determine whether to report positional information increases. In other embodiments, the number of the number of input object states that are used to determine whether to report positional information is based on an indication from the electronic system (or host device). In such embodiments, the number may be application based, mode based, and/or based on some other parameter set by the electronic system.

In one embodiment, touch buffer 310 of noise mitigation module 308 is configured to store a plurality of input object states corresponding to a second input object. In such an embodiment, the noise mitigation module is configured to limit reporting positional information of the second input object when the pluralities of the input object states of the touch buffer indicate that: (i) the first input object and a second input object were proximate a first receiver electrode 305 during an overlapping period of time; (ii) and the second input object was determined to be proximate the first receiver electrode 305 after the first input object was determined to be proximate the first receiver electrode 305. Further, in one embodiment, noise mitigation module 308 is configured to report the positional information of the first input object when a plurality of input object states corresponding to the first input object satisfies the input object state threshold. In yet another embodiment, limiting the reporting of the positional information of the second input object comprises rejecting (ignoring, or the like) reporting of the positional information of the second input object. In an additional embodiment, limiting the reporting of the positional informational of the second input object comprises increasing an input object state threshold corresponding to the second input object and reporting the second input object when the input object state threshold is satisfied. Stated another way, noise mitigation module 308 may choose not to report or adjust the reporting of the positional information for input objects that are proximate to a receiver electrode that already has an input object proximate to it. In one embodiment, once a second input object has been proximate a receiver electrode for a period of time satisfying a threshold amount of time, positional information corresponding to the second input object may be reported.

In one embodiment, noise mitigation module 308 is configured to filter "new" input objects that appear in the sensing region of a particular receiver electrode within a predetermined number of capacitive frames (a period of time) of another input object leaving the sensing region of that receiver electrode. In one embodiment, the predetermined number of frames may be configurable or dynamically adjusted based on the level of noise and/or one or more other parameters. In various embodiments, filtering may comprise suppressing, ignoring, delaying for a period of time and the like. Further, a "new" input object may refer to an input object sensed in the sensing region that was not present in the sensing region before. This "new" input object may be the same input object that was removed from the sensing region or a different input object that was previously not sensed within the sensing region. In various embodiments, filtering "new" input objects may improve the ability of processing system 110 to prevent a determination that an input object is in the sensing region of the sensing device when no input object is actually there. Such an error in input object reporting may be referred to as "ghost finger" effect.

In one embodiment, noise mitigation module 308 is configured to report positional information based on a smoothing function applied to the input object states within touch buffer 310. In a relatively simple embodiment with low computational complexity, an averaging function may be applied to one or more of the input object states $b_0$, $b_1$, . . . $b_N$. That is, the reported positional information may simply be the average (i.e., spatial average) of all or some of the input object states within touch buffer 310. In some embodiments, a subset of the touch buffer is averaged—e.g., one or more input object states in the vicinity of dequeuing index 404. In FIG. 4, for example, the average of $b_3$, $b_4$, and $b_5$ may be reported (the state occurring at dequeuing index 404 plus the states before and after that value in the buffer). Other smoothing functions may also be applied to the input object states within buffer 310, including interpolation, curve-fitting, and other such algorithms and/or functions. In general, this positional averaging or smoothing assists in removing "jitter" and errors in positional information that may appear as positional jumps associated with operating in a high-noise modes.

In one embodiment, noise mitigation module 308 is configured to insert input object states into touch buffer 310 when it appears that an input object was not present within the sensing region for a threshold period of time. That is, noise mitigation module 308 may infer that, because of the relatively high noise level, missing information regarding a particular input object within touch buffer 310 may be the result of the noise itself. In such a case, one or more input object states (e.g., an average of all other states) is inserted into the corresponding locations within touch buffer 310.

In various embodiments, the data stored within touch buffer 310 may be used for additional purposes. For example, the trajectory of the input object or objects may be determined to assist with improving linearity. In other embodiments, relaxation and re-zeroing of the baseline image may be performed based on analysis of data within touch buffer 310, thereby reducing false-positives. For example, in one embodiment, if the data in the touch buffer 310 indicates that there is no input object in the sensing region of the input device 100, fast relaxation of the baseline image may occur. In other embodiments, the input objects identified within touch buffer 310 may be "sorted" based on past trajectory, rather than a "nearest-neighbor" approach. In yet another embodiment, input object data within buffer 310 is used to determine the trajectory of various input objects and thereby determine whether an input object is moving very quickly or "drumming" of multiple input objects is occurring. In one example embodiment, drumming of multiple input objects comprises a first input object being removed from the sensing region at a first location and a second input object entering the sensing region at a second location, where each of these events occurs within quick succession of each other. In various embodiments, an input object that moves very quickly between two locations may look similar to the "drumming" of input object at those to locations. It is possible to properly disambiguate these two events by analyzing the trajectory of the input object data stored within the touch buffer. In one embodiment, input object data corresponding to two input objects that were drumming may lack the proper trajectory information that would indicate an input object is moving between two locations, and a drumming event may be indicated.

In various embodiments, any of the above noise-mitigation techniques may be combined such that one or more may be performed on the same input object states stored within the touch buffer. In one embodiment, processing system 110 may perform a first one of the above techniques, and based on the amount of measured noise, processing system 110 may also perform one or more other techniques. For example, as the measured amount of noise increases, processing system 110 may perform additional ones of the above techniques. Further, in other embodiments, processing system 110 may perform two or more of the above techniques simultaneously and based of the output of those techniques, make a decision on whether or not to limit reporting of positional information. In yet other embodiments, processing system 110 may sequentially perform two or more of the above techniques. In some embodiments, processing system 110 may select the technique or techniques to perform based on a measured amount of noise. In some embodiments, processing system 110 may select the technique or techniques to perform based on a parameter set by the electronic system (or host device).

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for an input device, the processing system comprising:
   a sensor module comprising sensor circuitry, the sensor module configured to drive a plurality of transmitter electrodes with transmitter signals, and receive, with a plurality of receiver electrodes, resulting signals comprising effects corresponding to the transmitter signals; and
   a noise mitigation module comprising a touch buffer and configured to:
      determine positional information for a first input object in a sensing region of the input device based on the resulting signals and to report the positional information,
      store a first plurality of input object states corresponding to the first input object in the touch buffer, wherein each of the first plurality of input object states is a position of the first input object in the sensing region,
      compare a count of the first plurality of input object states stored in the touch buffer to a first input object state threshold count, and
      limit the reporting of positional information of the first input object in response to both being in a high-noise mode and the count of the first plurality of input object states stored in the touch buffer being less than the first input object state threshold count.

2. The processing system of claim 1, wherein the touch buffer is further configured to store a second plurality of input object states corresponding to a second input object, and wherein the noise mitigation module is configured to limit reporting positional information of the second input object when the first and second pluralities of the input object states of the touch buffer indicate that:
- the first input object and the second input object were proximate to a first receiver electrode of the plurality of receiver electrodes during an overlapping period of time; and
- the second input object was determined to be proximate to the first receiver electrode after the first input object was determined to be proximate to the first receiver electrode.

3. The processing system of claim 2, wherein the noise mitigation module is configured to report the positional information of the first input object when the count of the first plurality of input object states corresponding to the first input object exceeds the first input object state threshold count.

4. The processing system of claim 2, wherein limiting the reporting of the positional information of the second input object comprises rejecting the reporting of the positional information of the second input object.

5. The processing system of claim 2, wherein limiting the reporting of the positional information of the second input object comprises increasing a second input object state threshold corresponding to the second input object and reporting the second input object when the second input object state threshold is satisfied.

6. The processing system of claim 1, wherein the noise mitigation module is configured to report positional information based on a smoothing function applied to the first plurality of input object states stored within the touch buffer.

7. The processing system of claim 1, wherein the noise mitigation module is configured to add at least one input object state to the first plurality of input object states stored within the touch buffer when the first input object is determined to be removed from the sensing region for a period of time that is less than a time period threshold.

8. The processing system of claim 1, wherein the touch buffer includes N input object states and has a dequeuing index equal to approximately N/2.

9. A method for an input device, comprising:
- transmitting a plurality of transmitter signals using a plurality of transmitter electrodes;
- receiving, with a plurality of receiver electrodes, resulting signals comprising effects corresponding to the transmitter signals;
- determining positional information for a first input object in a sensing region of the input device based on the resulting signals;
- storing a first plurality of input object states corresponding to the first input object in a touch buffer, wherein each of the first plurality of input object states is a position of the first input object in the sensing region;
- reporting the positional information;
- comparing a count of the first plurality of input object states stored in the touch buffer to an input object state threshold count; and
- limiting the reporting of positional information of the first input object in response to both being in a high-noise mode and the count of the first plurality of input object states stored in the touch buffer being less than the input object state threshold count.

10. The method of claim 9, further comprising:
- storing a second plurality of input object states corresponding to a second input object; and
- limiting the reporting of positional information of the second input object when the first and second pluralities of the input object states of the touch buffer indicate that:
  - the first input object and the second input object were proximate to a first receiver electrode of the plurality of receiver electrodes during an overlapping period of time; and
  - the second input object was determined to be proximate to the first receiver electrode after the first input object was determined to be proximate to the first receiver electrode.

11. The method of claim 9, further including adding at least one input object state to the first plurality of input object states stored within the touch buffer when the first input object is determined to be removed from the sensing region for a period of time that is less than a time period threshold.

12. A sensor device comprising:
- a plurality of transmitter electrodes associated with a sensing region;
- a plurality of receiver electrodes associated with the sensing region;
- a processing system communicatively coupled to the plurality of transmitter electrodes and the plurality of receiver electrodes, the processing system configured to:
  - transmit a plurality of transmitter signals using the plurality of transmitter electrodes;
  - receive, with the plurality of receiver electrodes, resulting signals comprising effects corresponding to the transmitter signals;
  - determine positional information for a first input object based on the resulting signals;
  - report the positional information;
  - store a first plurality of input object states corresponding to the first input object in a touch buffer, wherein each of the first plurality of input object states is a position of the first input object in the sensing region;
  - compare a count of the first plurality of input object states stored in the touch buffer to a first input object state threshold count; and
  - limit the reporting of positional information of the first input object in response to both being in a high-noise mode and the count of the first plurality of input object states stored in the touch buffer being less than the first input object state threshold count.

13. The sensor device of claim 12, wherein the processing system is further configured to store a second plurality of input object states corresponding to a second input object and to limit reporting positional information of the second input object when the first and second pluralities of the input object states of the touch buffer indicate that:
- the first input object and the second input object were proximate to a first receiver electrode of the plurality of receiver electrodes during an overlapping period of time; and
- the second input object was determined to be proximate to the first receiver electrode after the first input object was determined to be proximate to the first receiver electrode.

14. The sensor device of claim 13, wherein limiting the reporting of the positional information of the second input object comprises increasing a second input object state threshold corresponding to the second input object and reporting the positional information of the second input object when the second input object state threshold is satisfied.

15. The sensor device of claim 12, wherein the processing system is configured to add at least one input object state to the first plurality of input object states stored within the touch buffer when the first input object is determined to be removed from the sensing region for a period of time that is less than a time period threshold.

16. The sensor device of claim 12, wherein the touch buffer includes N input object states and has a dequeuing index equal to approximately N/2.

17. The sensor device of claim 12, wherein the processing system is configured to report positional information based on a smoothing function applied to the first plurality of input object states stored within the touch buffer.

* * * * *